(No Model.)
C. TWOMBLY.
THILL COUPLING.
No. 374,566. Patented Dec. 6, 1887.
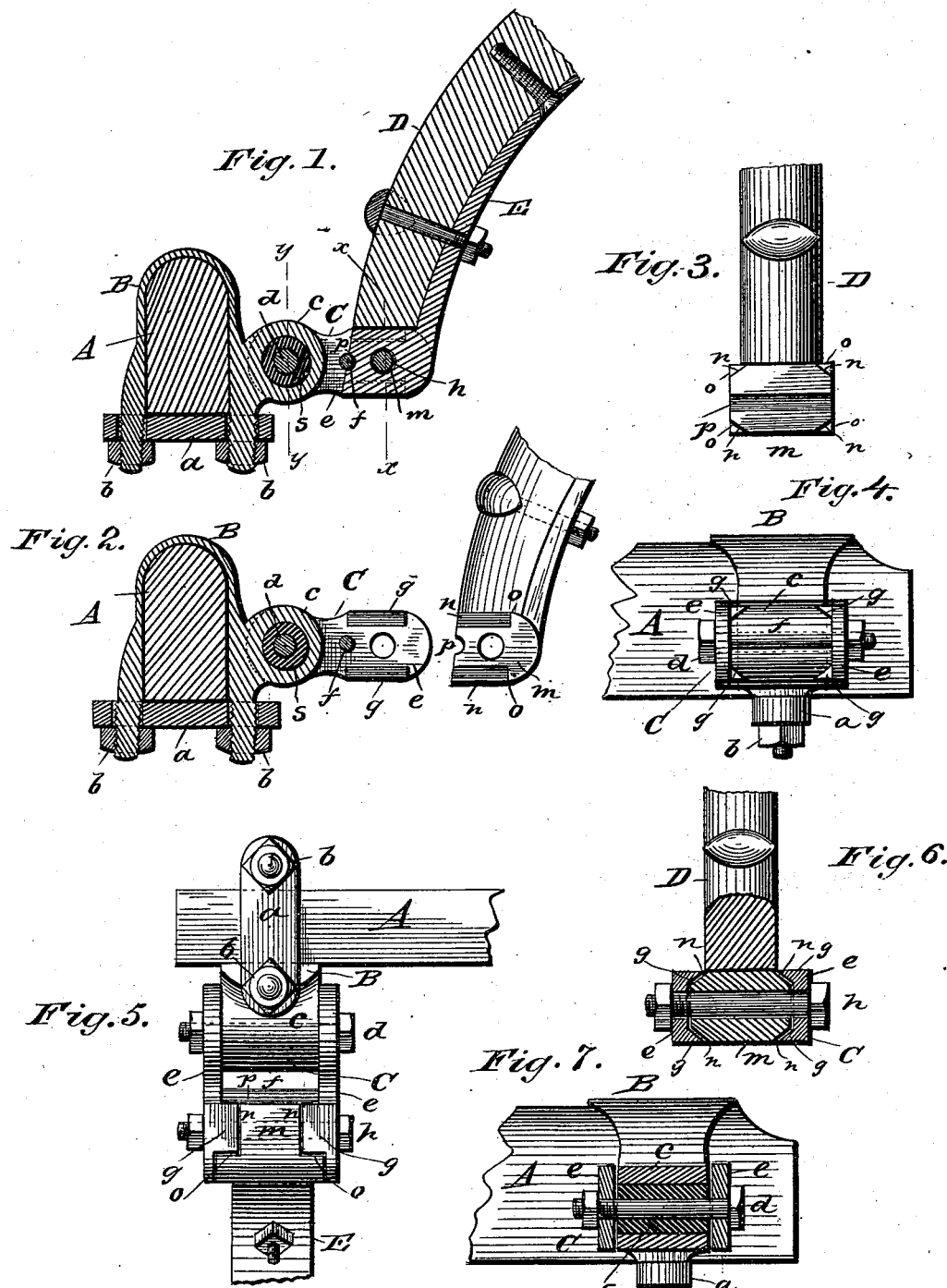
WITNESSES
Phil C. Dietrich
E. Everett Ellis
INVENTOR
Charles Twombly
By Wm. C. McIntire, Attorney

UNITED STATES PATENT OFFICE.

CHARLES TWOMBLY, OF DOVER, NEW HAMPSHIRE, ASSIGNOR OF ONE-HALF TO JAMES I. CHRISTIE, OF SAME PLACE.

THILL-COUPLING.

SPECIFICATION forming part of Letters Patent No. 374,566, dated December 6, 1887.

Application filed July 20, 1887. Serial No. 244,794. (No model.)

*To all whom it may concern:*

Be it known that I, CHARLES TWOMBLY, a citizen of the United States, residing at Dover, in the county of Stafford, State of New Hampshire, have invented new and useful Improvements in Thill-Couplings, of which the following is a specification.

This invention relates to certain new and useful improvements in thill-couplings; and it consists, substantially, in such features of construction, arrangement, and combinations of parts as will hereinafter be more particularly described, and pointed out in the claims.

The object of the invention is to provide this class of devices of a simplified construction which shall enable the attachment or adjustment of a thill or pole to the fore axle of a vehicle to be performed with much greater facility than is accomplished by many former inventions of a like character.

Further, the invention has for its object to enable a rapid change from thills to a pole, or vice versa, without the necessity of detaching the coupling proper from the clip which holds the same to the axle, and, finally, the invention has such other objects in view as will more fully hereinafter appear, when taken in connection with the accompanying drawings, wherein—

Figure 1 represents a sectional view of a thill and axle having in connection therewith a thill-coupling embodying my invention. Fig. 2 is a view representing the inner construction of the coupling, and also indicating the manner of insertion of the thill-iron between the jaws of the coupler in effecting an attachment of the thill to the axle. Fig. 3 is a view in detail to represent more clearly the construction of the eye formed with the thill-iron, and Fig. 4 is a view of the coupling and axle-clip as when viewed from the front. Fig. 5 is a bottom plan view representing the thill as when coupled. Fig. 6 is a sectional view taken on the line $x\ x$ of Fig. 1, and Fig. 7 is a similar view taken on the line $y\ y$ of said Fig. 1.

Reference being had to the several parts by the letters marked thereon, A represents the fore axle of a vehicle, and B the clip fitting around the same and secured in position by means of a plate, $a$, and nuts $b\ b$, the said clip being formed or provided with an eye or sleeve, $c$, designed for the reception of the bolt $d$, which connects the coupling device to the clip.

C represents the coupler, which is constituted of two jaws, $e\ e$, which, after being secured to the clip by means of the bolt $d$ and tightening-nuts, are maintained in position or held together by means of a pin, $f$, thus obviating any slipping apart of the said jaws, which would tend to inconvenience the proper insertion between them of the eye of the thill-iron. The said jaws are formed on their inner faces with upper and lower projecting lips $g\ g$, which are wedge shape in transverse section, as shown, and which serve between them to receive the thill-eye in the manner to be explained hereinafter. These jaws are also formed at each end with an opening for the reception of the bolt $d$ and the bolt $h$, respectively, the former being, as stated, for attaching the coupling-jaws to the clip, while the latter bolt is for securing the thill-iron or eye in place between said jaws.

D represents the thill, and E the thill-iron secured thereto in any ordinary or well-known manner. This thill-iron is provided at its extremity with an eye, $m$, fitting closely around the end of the thill, and having each of the four side edges thereof beveled, as at $n$, to conform to the shape of the lips $g\ g$ of the coupler, the small shoulders $o$ thereon acting as stops, against which the ends of the lips abut and prevent the eye from being inserted too far. The said eye $m$ is formed on its inner surface with a groove, $p$, which receives the pin $f$ of the coupler when the eye is inserted between the jaws, and the said pin $f$, besides acting to hold the jaws in position while effecting the coupling, also serves as an additional security in maintaining the attachment of the thill to the coupler—in other words, the connection is strengthened.

Surrounding the bolt $d$ within the sleeve or eye $c$ is a small rubber tube, $s$, which, when the vehicle is in motion, prevents any jar or friction, as will be apparent.

From the foregoing description it is thought the construction and arrangement of parts contributing toward my invention will be thoroughly understood; but I desire to state that I do not wish to be confined to such in precise detail, as it is evident that material changes therefrom could be resorted to and still come within the scope of my invention. For instance, the lips projecting from the inner surfaces of the jaws need not necessarily be made wedge shape in transverse section, but could be of various other configurations, as well also as the edges of the thill-eye, which should of course conform to such lips, so as to nicely fit the same in the manner intended. I prefer, however, in the practice of my invention to resort to such construction and arrangement of parts as I have herein shown and described.

In the practice of the invention the jaws are secured to the eye or sleeve of the clip by means of the securing-bolt $d$, the rubber tube having of course been previously inserted in the eye for the purpose of preventing friction and rattle in the motion of the vehicle; and when it is desired to attach the thills the eye of the thill-iron is inserted between the jaws in such manner as that the lips of the latter will fit the four side edges of the said eye in the manner shown and explained, and the effectiveness of the coupling, it is thought, will be apparent. It will further be seen that quick and rapid changes can be made from thills to a pole, and vice versa.

Having thus described my invention, what I claim as new, and desire to secure by Letters Patent, is—

1. In thill-couplings, the combination, with the axle-clip, of a pair of jaws pivoted thereto, shaped on their inner faces to receive a thill-eye, and the thill-iron formed with an eye adapted for such reception, substantially as described.

2. In thill-couplings, the combination, with the axle-clip, of a pair of jaws pivoted thereto, formed with lips or projections on their inner faces, and the thill-iron formed with an eye having its side edges shaped to receive said lips and having shoulders $o$, substantially as described.

3. In thill-couplings, the combination, with the axle-clip, of a pair of jaws pivoted thereto, shaped on their inner faces to receive a thill-eye, and held together by a pin, $f$, and the thill-iron formed with an eye adapted for such reception and having a groove on its inner face for receiving said pin, as described and shown.

4. In thill-couplings, the combination, with the axle-clip having eye or sleeve $c$, provided interiorly with a rubber tube, of a pair of jaws attached on opposite sides of said sleeve by means of a bolt passing through the tube and having the lips on their inner faces, and the thill-iron having the eye beveled on its edges, the same being secured between the jaws by means of a bolt, substantially as described.

In testimony whereof I have hereunto set my hand in the presence of two subscribing witnesses.

CHARLES TWOMBLY.

Witnesses:
G. X. WADLEIGH,
GEORGE H. BOYD.